(12) United States Patent
Johnson et al.

(10) Patent No.: US 8,346,405 B1
(45) Date of Patent: Jan. 1, 2013

(54) MAP INTERFACE FOR ELECTRICAL SYSTEM DISCHARGE TRACE PLAYBACK

(75) Inventors: Bartley Arthur Johnson, Portland, OR (US); Forrest S. Seitz, Beaverton, OR (US)

(73) Assignee: Radar Engineers, Portland, OR (US)

( * ) Notice: Subject to any disclaimer, the term of this patent is extended or adjusted under 35 U.S.C. 154(b) by 664 days.

(21) Appl. No.: 12/611,857

(22) Filed: Nov. 3, 2009

(51) Int. Cl.
*G06F 7/00* (2006.01)
*G01C 21/00* (2006.01)
(52) U.S. Cl. .......................................... 701/1; 701/400
(58) Field of Classification Search ............... 701/1, 400
See application file for complete search history.

(56) References Cited

U.S. PATENT DOCUMENTS

| | | | |
|---|---|---|---|
| 7,874,198 B2* | 1/2011 | Groves | 73/31.01 |
| 8,219,599 B2* | 7/2012 | Tunstall-Pedoe | 707/603 |
| 2009/0012865 A1 | 1/2009 | Celik | |
| 2009/0089149 A1 | 4/2009 | Lerner et al. | |
| 2009/0090167 A1 | 4/2009 | Groves | |
| 2009/0095054 A1 | 4/2009 | Groves | |

* cited by examiner

*Primary Examiner* — Yonel Beaulieu
(74) *Attorney, Agent, or Firm* — Klarquist Sparkman, LLP

(57) ABSTRACT

A diagnostic instrument for sources of electrical system discharges provides a map interface for controlling playback of collected signal traces. A map pane of the interface displays a map of an area illustrating a path along which signal data was collected. A double click input selecting a location on the path causes playback of a waveform for the recorded signal in a signal pane commencing from the selected location.

5 Claims, 5 Drawing Sheets

Software 680 implementing electrical system discharge locating application with map interface

MAP INTERFACE FOR ELECTRICAL SYSTEM DISCHARGE TRACE PLAYBACK

BACKGROUND

Electrical discharges or arcs in the form of sparks and corona are present on virtually all electrical power distribution systems. Sparks can sometimes be seen as small bright flashes, while corona can sometimes be seen as a bluish glow around high voltage wires. They also create audible crackling or sizzling noise. Moreover, the discharges generate radio frequency (RF) noise that can be heard as static or buzzing on radio receivers, such as on HAM radio receivers. Further, some electrical discharges on electrical power distribution systems can be signs of potential maintenance issues, such as up to imminent equipment failure. Accordingly, finding the source of electrical discharges relating to electric power distribution systems is of interest for both resolving interference complaints associated with telecommunications equipment (e.g., by HAM radio operators, or broadcast television and radio reception), as well as for system maintenance purposes.

Various devices are currently available for locating sparks on electric power system equipment, such as the Radio Frequency Interference (RFI) Locator Models 240, 242 and M330 and Parabolic Pinpointer Ultrasonic Locator Model 250 manufactured and distributed by Radar Engineers. In general, these devices include a radio frequency receiver or an ultrasonic receiver connected with an oscilloscope display combined in a portable unit that can be carried by electric power system personnel in the field.

SUMMARY

The following Detailed Description concerns systems and methods that provide a map interface for controlling playback of a recorded signal trace, such as for use by maintenance personnel and others in diagnosing and locating electrical discharges on electrical distribution systems. In one example, a portable or vehicle mounted unit receives and records a signal trace and location data while traveling along electrical transmission lines or otherwise about a geographical area served by an electric power distribution system. For playback, the system provides a map interface that displays a map in one display pane showing a plotted route traveled while recording the signal trace. A second display pane shows the recorded signal trace. During playback, a position indicator moves along the plotted route on the map in correlation with playback of the recorded signal trace in the second pane. The user can control playback of the signal trace by clicking or other input selecting a location along the plotted route on the map. In response, the map interface plays the recorded signal trace and position indicator starting from the selected location on the map. This facilitates more quickly reviewing and replaying and analyzing the signal trace for suspected locations of electrical discharges on the electrical power distribution system.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The following detailed description concerns systems and techniques to provide a map interface for controlling playback and review of a recorded signal trace or waveform to facilitate identification of the location of electrical discharges on an electrical power distribution system. The map interface techniques are described with reference to its implementation in a particular electrical power system diagnostic instrument. One example of the technique is housed in a diagnostic instrument that can be mounted or carried in a vehicle, so as to allow a utility employee to patrol a geographic area of the electric system using the instrument to monitor for sparking or static activity. Alternatively, the diagnostic instrument can be a handheld, luggable or otherwise portable unit that the utility employee can carry in the field to locate sources of electrical discharges from an electric power system. The example implementation of the technique is described in the context of a dedicated or specific purpose instrument, but alternatively can be implemented as a multi-purpose instrument or as one among many applications of general purpose hardware. Accordingly, it should be recognized that the techniques can be realized on a variety of different instruments or devices utilized for electrical power system diagnostics and maintenance.

Figure 1:
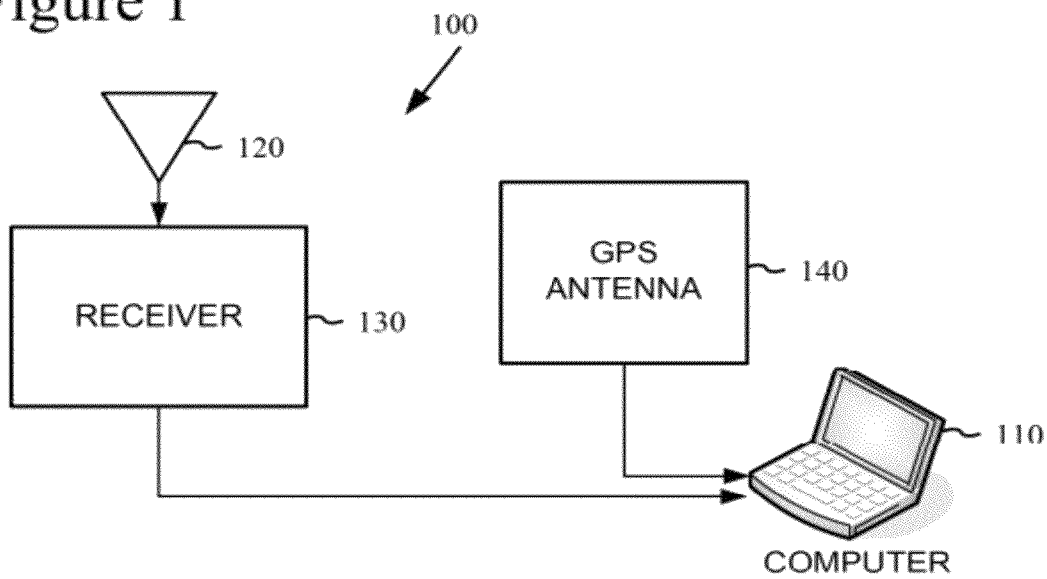
FIG. 1 is a diagram of a diagnostic instrument for recording of a signal trace along a geographic path and playback using a map interface to facilitate identification of and locating a source of electrical discharges on an electrical power distribution system.

An exemplary embodiment of an instrument 100 that provides a map interface for identifying and locating electrical discharges on electrical power distribution systems is shown in FIG. 1. The instrument 100 includes a computer 110, a radio frequency antenna 120 and receiver 130, and a global positioning system (GPS) receiver 140. For portability, the computer 110 can be a laptop personal computer (PC), but other form factors including netbook, tablet, personal digital assistant (PDA), mobile phone and desktop or rack mountable computers could alternatively be used. The receiver 130 is an instrument for receiving electromagnetic radiation signals over a broad range of the radio frequency spectrum, and various radio frequency receiver models available from Radar Engineers (e.g., the Radar Engineers model 242 receiver) and other manufacturers can be employed. Alternatively, the receiver 130 can receive signals other than electromagnetic radiation in the radio frequency range, such as electromagnetic radiation in other frequency ranges (e.g., microwave) or acoustic energy. The GPS receiver 140 receives signals from GPS satellites to provide data as to the geographical position (latitude and longitude) of the instrument. In the illustrated embodiment, the radio frequency receiver has audio and video outputs that are connected to the audio input ports of the computer 110 via a custom cable. The GPS receiver connects to the computer via a universal serial bus (USB) connector.

Although the illustrated embodiment has separate radio frequency receiver and GPS receiver units connected with a laptop computer, alternative embodiments can have these components integrated into and housed as a single unit. For example, a processor and display screen providing the map interface described below can be incorporated into a receiver housing to provide a single unit for easier portability.

Figure 2:
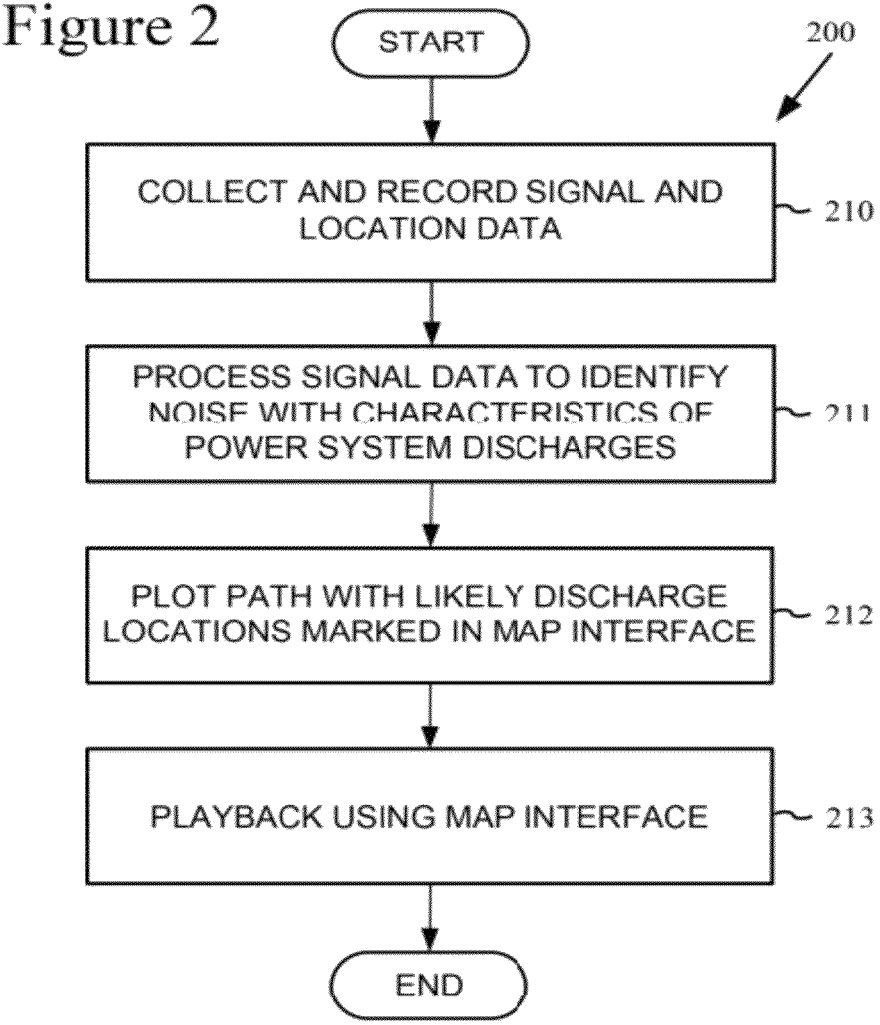
FIG. 2 is a flow diagram of a software application with the map interface, which runs on the diagnostic instrument of FIG. 1.

The computer 110 runs a software application for identifying and locating electrical discharges on electrical power distribution systems. The software application has the operation as generally illustrated in FIG. 2. A first action 210 of the operation process 200 involves data collection in the field. In typical use, a user drives a vehicle in which the diagnostic instrument is mounted or carried through an area of an electrical power distribution system. To begin data collection, the user powers on the components 110, 130 and 140 of the diagnostic instrument 100 shown in FIG. 1, and runs the software application on the computer 110. In the software application, the user selects a data collection mode (via "Rec" button 390 in FIG. 3), and presses a record button to begin data collection. The computer 110 then simultaneously records signal data from the radio frequency receiver, and location data from the GPS receiver. With the outputs of the radio frequency receiver connected at the audio port input of the computer 110, the computer records the signal data from as a .wav file (48 kHz sampling rate, stereo, 8 bit resolution), but alternatively can be recorded in other file formats and other data sampling parameters. The recorded signal data is also referred to herein as a signal trace or waveform. In the illustrated diagnostic instrument, the location data from the GPS receiver is recorded in a separate data file as latitude/longitude value pairs at a rate of once per second. The location data alternatively can be recorded in other data formats and sampling parameters.

In the example illustrated diagnostic instrument, the software application also processes the signal data to identify the presence of signal characteristics that may be indicative of electrical discharges by electrical power distribution system equipment, as shown at action 211. The diagnostic instrument can perform this processing during data capture and recording, or alternatively as a post process on a recorded signal data file. The diagnostic instrument records data of the results of this processing with the location data, such as by marking those location samples in the location data file that meet the processing criteria indicative of electrical discharges by an electrical power system at the location.

Discharges on electric power systems exhibit a variety of characteristics. Typically, a discharge will occur when two pieces of metal on a power line are separated by a small gap (e.g., 1 mm) and there is a voltage gradient between the metal parts (e.g., 1000+V.). In a 60 Hz power system, there will typically be one or more discharges in each half cycle. Each such sparking source can be characterized in several ways. For example, by the number of discharges per half cycle, by the amplitude of the discharges, the location of the discharges on the phase, the spacing of the discharges, and the time density of the discharges, etc. The discharges radiate electromagnetic and other energy (e.g., acoustic). These characteristics can be observed from the noise produced by the discharge using a radio frequency receiver, acoustic pick-up, oscilloscope, or the like. Due to differences in gap distance, geometries and size of the metal parts, presence of electrical insulators, and etc., the discharge characteristics may vary significantly between individual spark sources on power lines.

In general, the diagnostic instrument identifies whether the signal data received from the radio frequency receiver exhibits characteristics of electrical discharges by electrical power system equipment based on whether the signal has a noise component correlating to the fundamental frequency of the electrical power system (e.g., typically 60 Hz for electrical power systems in the United States). In one example, the processing can include applying a Fast Fourier Transform (FFT) or like spectral analysis transform, and examining the value of the resulting transform coefficient for the 60 Hz frequency. Alternatively, the processing can use other criteria such as detecting and counting noise pulses, or such as measuring the density of noise pulses per half of the electrical power cycle. Alternatively, the diagnostic instrument could use still other processing techniques to detect the presence of noise correlating to the electrical power system cycle in the signal data.

When finished with data collection, the user of the diagnostic instrument clicks or presses keys for a stop control, and saves the recorded signal and location data files on the computer 110.

After data collection or at any later time, the user of the diagnostic instrument can review a playback of the recorded data using a map interface in a playback mode of the software application on the computer 110. The user switches from recording to playback mode by pressing a "play" button control, which switches to the map interface screen shown in FIG. 3. If returning at a later time, the user selects the data file (.wav file of the signal data, and accompanying location data file) of interest, and inputs a command to load the file (e.g., pressing a "load" button control in the interface).

Figure 3:
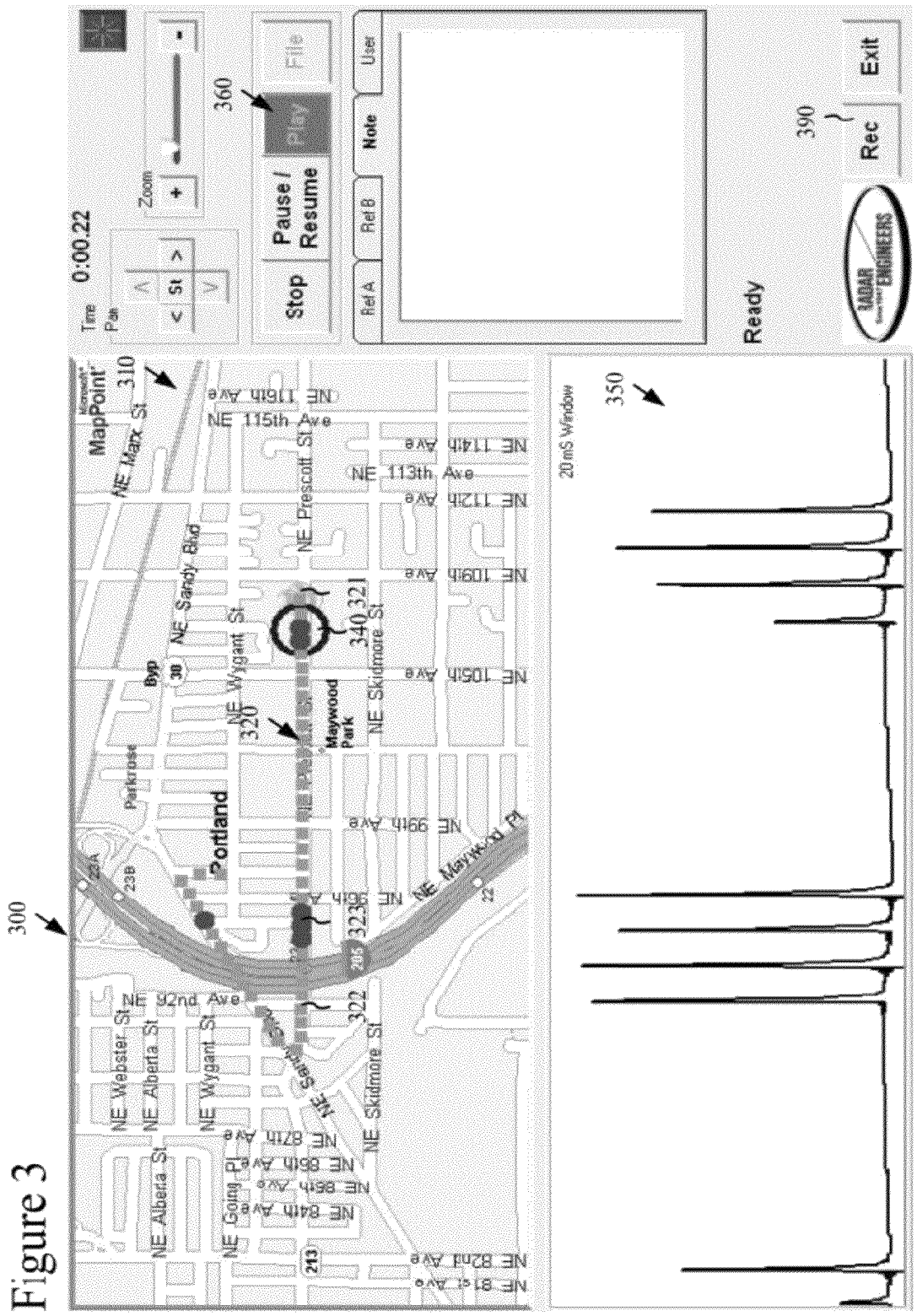
FIG. 3 is a view of a screen display on the diagnostic instrument of FIG. 1 with the map interface to facilitate identification and locating of electrical discharge on electrical power distribution systems.

In the playback mode, the software application on the computer 110 displays a map interface 300 on the screen as illustrated in FIG. 3. The map interface 300 includes a map pane 310 and a signal pane 350, along with a control panel 360. In the map pane, the application display a map of the area in which the signal data was collected. The illustrated instrument 100 obtains map information for the map pane from a map data service, such as Microsoft® MapPoint® or other map data service. The software application selects and displays an area of the map sufficient to contain a path traveled with the instrument during data collection.

As indicated at action 212 in FIG. 2, the software application plots out the path 320 traveled by the instrument on the map in the map pane from the recorded location data in the location data file. The software application also marks locations along the path at which the signal data met the criteria for detecting electrical discharges from an electrical power system. In the illustrated example, the locations along the path are marked with small green dots 322 where no electrical power system discharges were detected, and larger red dots 323 marking the locations meeting the criteria for detecting electrical power system discharges. A starting point of the path is marked by yellow blocks 321. Alternatively, other markings can be used in the map pane to mark locations 322 on the path 320 traveled during data collection, and likely locations 323 or points of electrical discharges from electrical power systems from the collected data, such as thickness of a line, labels or various other shapes or icons.

The map pane can panned in any direction, or zoomed in/out as desired using mouse inputs. For example, a mouse press/hold-and-drag input causes the map to pan in an indicated direction. A mouse click anywhere on the map away from the plotted path re-centers the map at the clicked location. The mouse scroll wheel can be used to zoom in or out.

Using controls (e.g., play, stop, and pause/resume) in the control panel 360 at the right of the map interface screen 300, the user can initiate and control playback of the collected data beginning from the starting point of the path (as indicated by action 213 of FIG. 2). During such playback, the software application plays a segment of a trace or waveform of the signal data in the signal pane 350. In the illustrated map interface, the map pane displays a 20 ms wide segment of the signal trace, but alternatively other length segments can be displayed. In alternative implementations of the map interface, the signal pane can provide other representations of the signal data, such as playing a spectrum of the signal produced via a spectral analysis of the signal data. Further, the signal trace can be played in the signal pane after applying processing to the signal data, such as noise pulse detection, pulse widening or other filtering of the signal data. Audio of the signal is simultaneously played on the computer's speakers. In the map pane 310, the software animates a path cursor or marker 340 showing a current location at which the signal was collected, and moving along the path in coordination with the signal being played in the signal pane. The playback is performed at the same speed at which the data was collected. Accordingly, if the user drove the area for 45 minutes collecting the signal data, then the playback would also take 45 minutes. A longer period of collection would take correspondingly longer to playback. This allows the user to properly view the signal for noise characteristics with characteristics of electrical discharges from electrical power system sources.

Figure 4:
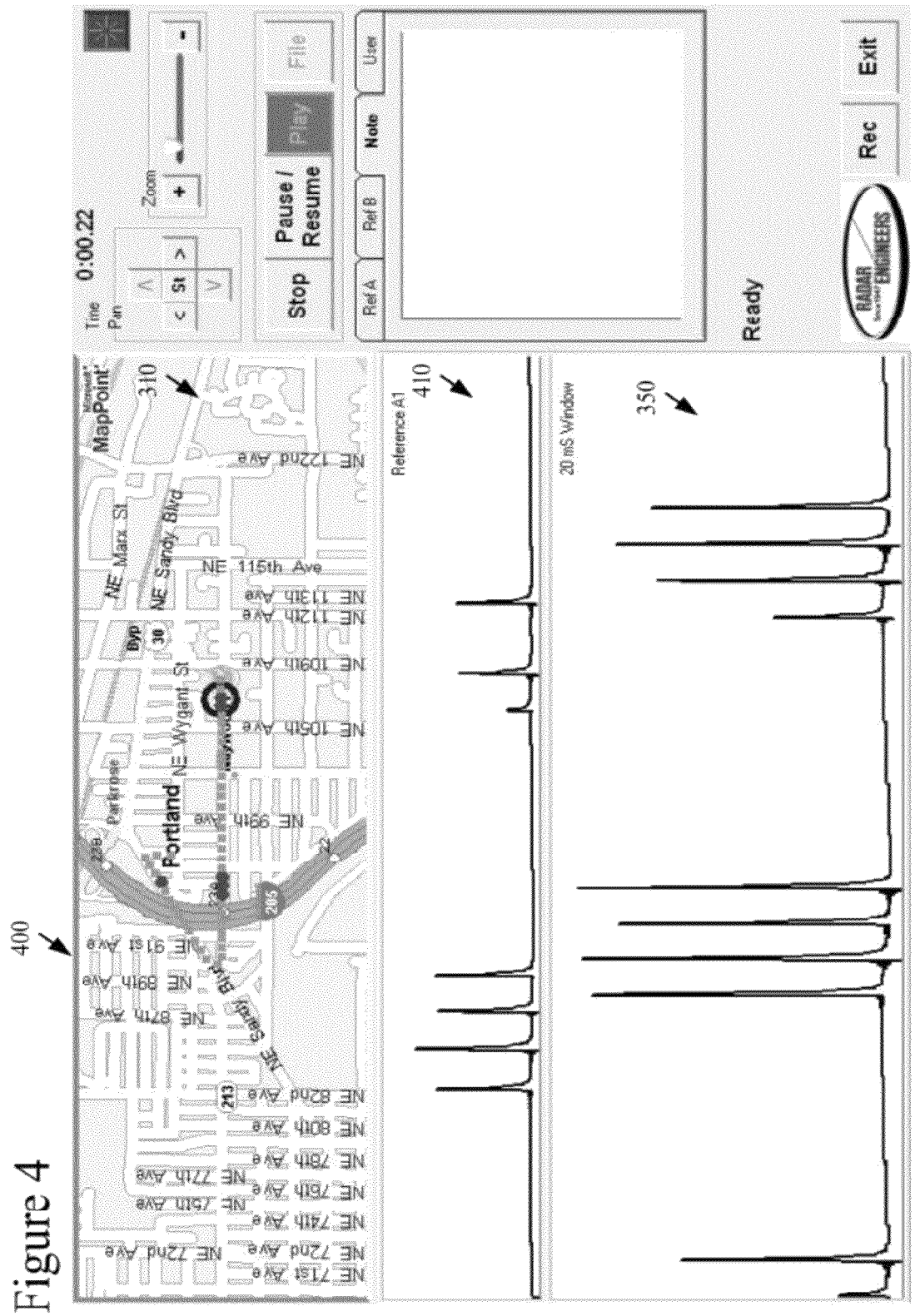
FIG. 4 is a view of another screen display on the diagnostic instrument of FIG. 1 with the map interface including a reference trace pane.

With reference to FIG. 4, the map interface also provides various additional controls to capture and save a segment of the signal presently shown in the signal pane, as well as recall a previously saved segment for display in an additional reference signal pane 410. This can be useful for capturing a noise signature of interference experienced with HAM radio or broadcast television or radio equipment to provide a reference for comparison during playback of signal data collected in the area. For example, upon receiving a noise interference complaint, a technician can attach the diagnostic instrument to an antenna of the complaining party's radio receiver, then save a segment of the noise interference signal. The technician can then drive around the nearby area, recording signal and location data with the diagnostic instrument. In the map interface, the diagnostic instrument can display the captured noise interference signature in the reference pane 410 for comparison to the playback signal in the signal pane 350.

Figure 5:
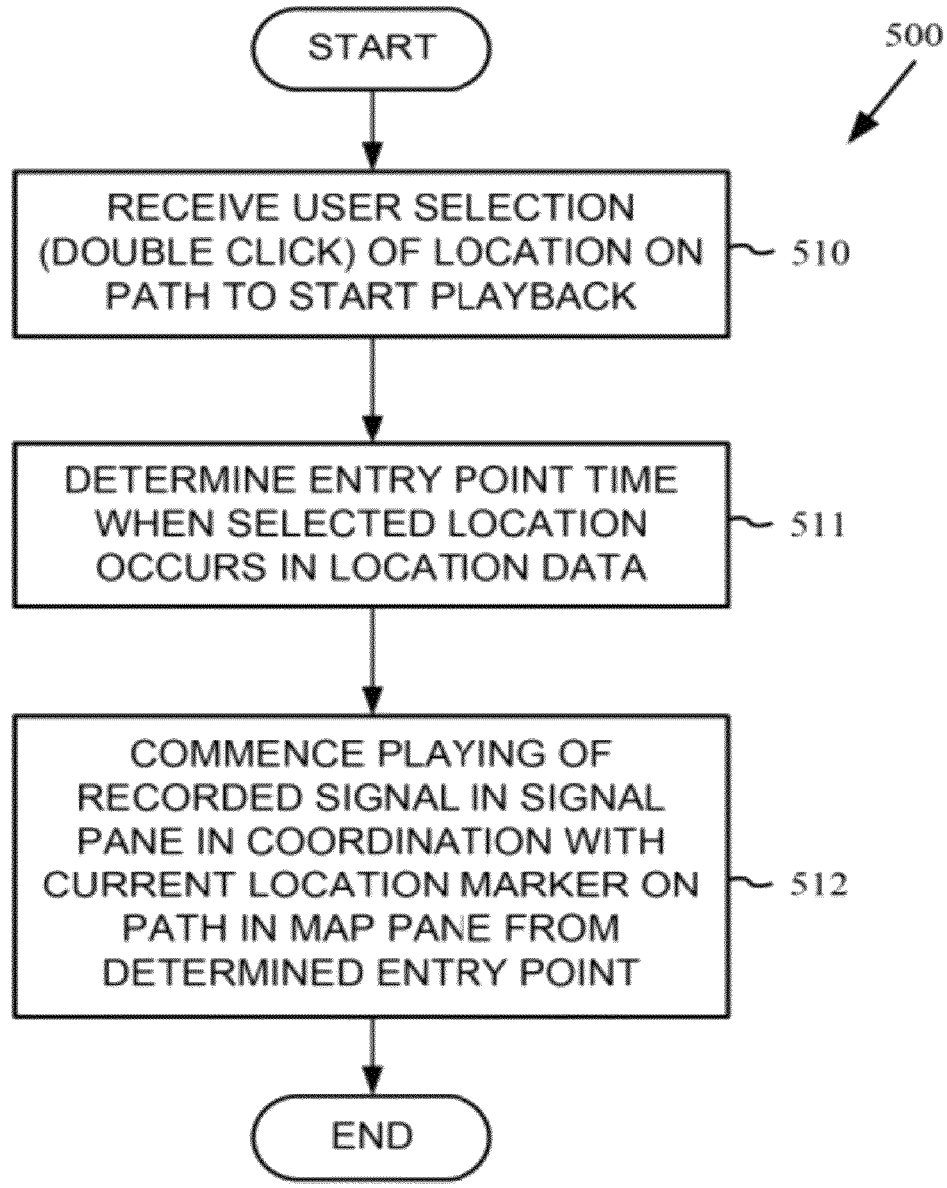
FIG. 5 is a flow diagram of a signal and location path playback process from a user-selected location on the map interface.

With reference now to FIG. 5, the map interface 300 of the software application on the computer 110 of the diagnostic instrument also provides a way for the user to more readily control playback and review of the signal data. With playback at normal speed, there are typically long periods of time when nothing of interest can be seen in the collected signal data. At various points along the path, there may be segments where noise characteristics of possible spark sources occur. However, the transmission lines of the electrical power system can act to radiate noise from a spark source for some distances along the path. Also, various other electromagnetic radiation sources (e.g., ignition sparks from an internal combustion engine) can exhibit characteristics similar to electrical discharges from electric power system sources. In addition, the electrical discharges from electric power systems can be an intermittent phenomenon, and have a very brief appearance in a recorded signal. For these reasons, it can be desirable to repeatedly playback the signal at different points for the various segments of the path marked during the processing action 211 as possible locations of an electrical power system sparking source, so as to find and verify exact locations which were most probably from a source of electrical discharges on an electrical power distribution system or that most closely match a captured reference noise signature.

In accordance with this playback control technique 500, the user can provide an input via the map interface to select a specific location along the data collection path 320 at any time during playback as shown at action 510. In the illustrated map interface, the selection input is via a mouse double click input on any of the dots 321-323 marking the data collection path 320. However, other forms of user input to select a specific point along the path alternatively can be taken. This location select input the initiates the playback control actions 510-512 illustrated in FIG. 5.

In response to the user's location selection input, the software application in action 511 determines an entry point corresponding to the location identified by the user's selection input. For example, this entry point can be an elapsed time for normal speed play back from the start point up to where the selected location occurs in the location data file. The software application searches the location data file for the location value pair corresponding to the user's location selection input, and determines the corresponding entry point time for the location value pair.

At action 512, the software application then immediately commences playback starting from the entry point determined in action 511, including playing the trace or waveform in the signal pane 350 along with audio on the speaker, as well as with the current location marker 340 following along the path in the map pane 310.

It should be apparent that this playback control technique 500 provides a much greater degree of control over the playback of the signal data, and allows the user to much more quickly focus in on and identify a location or locations along the data collection path of most probable electrical system discharge source(s) by being able to control repeated playback of the signal data from specifically selected points on the path. The playback control technique thus provides at least the benefits of (1) being able to quickly change playback from one point of the path to another without having to wait the playback to play through completely; and (2) being able to repeatedly play back the recorded signal trace for locations on the path to better observe noise sources that may appear only briefly in the recorded trace.

Figure 6:
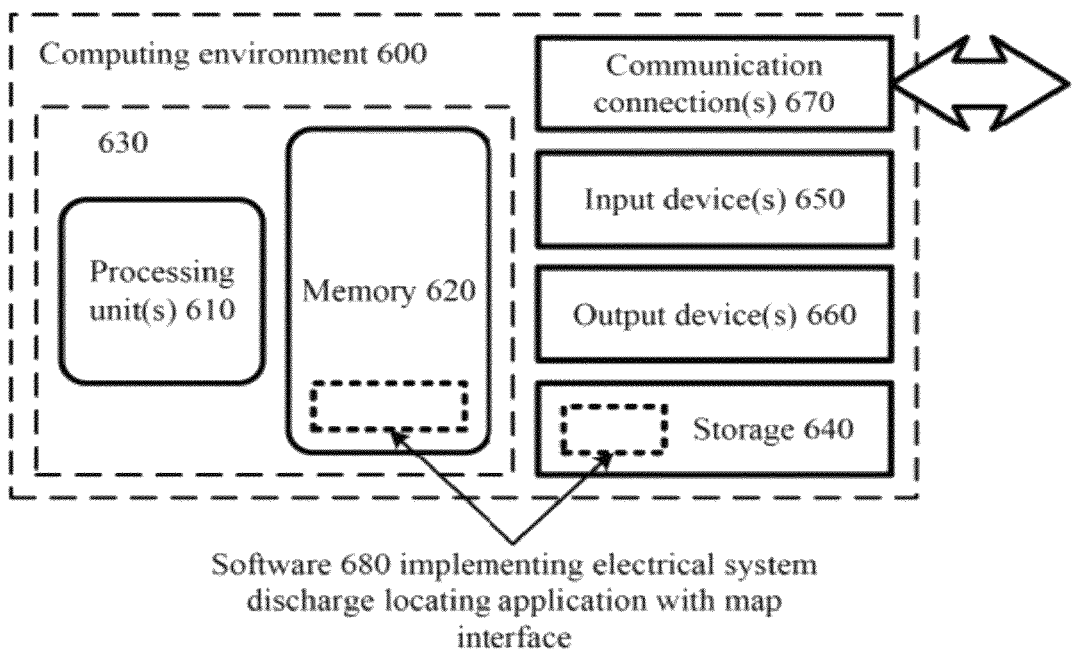
FIG. 6 is a block diagram of a computing environment used by the diagnostic instrument of FIG. 1 and software application of FIG. 2.

FIG. 6 illustrates a generalized example of a suitable computing environment 600 of the computer 110 for the diagnostic instrument 100 in FIG. 1. The computing environment 600 is not intended to suggest any limitation as to scope of use or functionality, as described embodiments may be implemented in diverse general-purpose or special-purpose computing environments. The computing environment 600 includes at least one processing unit 610 and memory 620. The processing unit 610 executes computer-executable instructions and may be a real or a virtual processor. The processing unit can include single or multiple processing cores, and may include single or plural processors and co-processors, and/or dedicated or special purpose processing units (e.g., an audio processor). The memory 620 may be volatile memory (e.g., registers, cache, RAM), non-volatile memory (e.g., ROM, EEPROM, flash memory), or some combination of the two. The memory 620 stores the software application 680 that provides the map interface described herein.

A computing environment may have additional features. For example, the computing environment 600 includes storage 640, one or more input devices 650, one or more output devices 660, and one or more communication connections 670. Typically, operating system software (not shown) provides an operating environment for the software application executing in the computing environment 600 and coordinates activities of the components of the computing environment 600. The storage 640 may be removable or non-removable, and includes magnetic disks, magnetic tapes or cassettes, CDs, DVDs, or any other medium which can be used to store information and which can be accessed within the computing environment 600. The storage 640 stores instructions for the software 680.

The computer can include various input device(s) 650 such as a keyboard, mouse, pen, touch screen or trackball, a voice input device and etc. that receives input from the user to the computing environment 600. For audio or video, the input device(s) 650 include input ports for a microphone, sound card, video card, similar devices that accepts audio or video input in analog or digital form, or a CD or DVD that reads audio or video samples into the computing environment. The output device(s) 660 may be a display, speaker, disk-writer, network adapter, or another device that provides output from the computing environment 600.

In view of the many possible embodiments to which the principles of our invention may be applied, we claim as our invention all such embodiments as may come within the scope and spirit of the following claims and equivalents thereto.

We claim:

1. A method of controlling playback of collected signal data using a computer providing a map interface on a display screen, the method comprising:
   receiving a signal from a receiver and location data from a global positioning receiver;
   recording sampled data of the received signal and the location data;
   displaying a map interface on the display screen having at least a map pane and a signal pane, wherein the map pane displays a map of an area in which the signal and location data was recorded and the signal pane displays a waveform of the recorded signal during playback;
   displaying graphic markings on the map in the map pane illustrating a path traveled during the recording based on the location data;
   in a playback mode of operation of the map interface,
      receiving input by a user of the computer indicating a location selection along the path;
      determining an entry point for the location selection in the recorded data; and
      initiating playback of the signal in the signal pane commencing from the entry point.

2. The method of claim 1 further comprising, in the playback mode of operation of the map interface, animating a current location marker moving along the path in the map pane in coordination with the signal playing in the signal pane to indicate a current location at which the signal being played was recorded.

3. The method of claim 1 further comprising producing an audio output of the signal to a speaker during playback of the signal in the signal pane.

4. The method of claim 1 wherein the received input by the user is a mouse double click at a location on the path displayed in the map pane.

5. The method of claim 1 further comprising:
   processing the data of the received signal to detect when a criteria characteristic of electrical discharge from electrical power systems is met;
   recording data indicating the locations in the recorded data at which the received signal met the criteria; and
   displaying with the graphical markings on the map illustrating the path distinguishing the locations along the path at which the received signal was detected to meet the criteria from other locations along the path.

\* \* \* \* \*